(12) United States Patent
Kim et al.

(10) Patent No.: US 12,646,069 B2
(45) Date of Patent: Jun. 2, 2026

(54) UNIVERSAL SELF-SERVICE KIOSK FRAUD DETECTION PLATFORM

(71) Applicant: Bank of America Corporation, Charlotte, NC (US)

(72) Inventors: Jinna Kim, Charlotte, NC (US); Paul Mattison, Sherrills Ford, NC (US); Timothy Scott Murphy, Charlotte, NC (US); Kristoffer M. Bertsch, Wilmington, DE (US)

(73) Assignee: Bank of America Corporation, Charlotte, NC (US)

( * ) Notice: Subject to any disclaimer, the term of this patent is extended or adjusted under 35 U.S.C. 154(b) by 275 days.

(21) Appl. No.: 18/229,776

(22) Filed: Aug. 3, 2023

(65) Prior Publication Data

US 2025/0045759 A1    Feb. 6, 2025

(51) Int. Cl.
*G06Q 20/40* (2012.01)
*G06Q 20/10* (2012.01)

(52) U.S. Cl.
CPC ..... *G06Q 20/4016* (2013.01); *G06Q 20/1085* (2013.01)

(58) Field of Classification Search
CPC ..................... G06Q 20/4016; G06Q 20/1085
USPC ....................................... 705/3–44
See application file for complete search history.

(56) References Cited

U.S. PATENT DOCUMENTS 6,626,357 B1 * 9/2003 Ross ........................ E05G 7/001
902/8
7,490,761 B2 * 2/2009 Taylor ................... G07F 19/201
235/382

7,503,481 B2    3/2009 Ramachandran et al.
8,595,490 B2 * 11/2013 von Mueller .......... G06Q 20/12
713/168
8,788,389 B1 * 7/2014 Fernandes .............. G06Q 20/40
705/42
11,403,645 B2    8/2022 Wiese et al.
(Continued)

OTHER PUBLICATIONS

Budnitz, "Mobile banking: gaps in the law imped risk assessment", Banking & Financial Services Policy Report 32.5: 11(10), Aspen Publishers, Inc. May. (Year: 2013).*

(Continued)

*Primary Examiner* — Frantzy Poinvil
(74) *Attorney, Agent, or Firm* — Banner & Witcoff, Ltd.

(57) ABSTRACT

Arrangements for universal self-service kiosk fraud detection are provided. A request for a transaction may be received via a self-service kiosk. The financial institution associated with the transaction may be identified as part of a consortium of financial institutions. Accordingly, a machine learning model particular to the consortium may be used to analyze the transaction. The model may output a determination of whether fraud or potential fraud exists in the transaction. In some examples, the machine learning model may be trained using historical transaction data from one or more financial institutions that are part of the consortium. If fraud is detected, one or more security actions associated with the transaction may be identified and executed. Further, one or more additional self-service kiosks that may be impacted by the fraud may be identified and security actions may be identified and transmitted to the one or more additional self-service kiosks for execution.

17 Claims, 12 Drawing Sheets

(56)  References Cited

U.S. PATENT DOCUMENTS

| 11,769,153 | B1 * | 9/2023 | Goetz | .................. | G07F 19/209 |
| | | | | | 705/43 |
| 2005/0073584 | A1 | 4/2005 | Enright et al. | | |
| 2015/0081493 | A1 * | 3/2015 | Johnson | .............. | G06Q 20/042 |
| | | | | | 705/35 |
| 2015/0278818 | A1 * | 10/2015 | Horgan | ................ | G07F 19/203 |
| | | | | | 705/43 |
| 2016/0005029 | A1 * | 1/2016 | Ivey | ........................ | G09C 1/00 |
| | | | | | 705/44 |
| 2016/0012445 | A1 * | 1/2016 | Villa-Real | ......... | G06Q 20/4016 |
| | | | | | 705/44 |
| 2016/0140562 | A1 * | 5/2016 | Birukov | ............ | G06Q 20/3224 |
| | | | | | 705/39 |
| 2022/0319283 | A1 | 10/2022 | Misra et al. | | |
| 2023/0214844 | A1 | 7/2023 | Fain et al. | | |
| 2023/0316284 | A1 * | 10/2023 | Kramme | ................ | G06Q 20/34 |
| | | | | | 705/44 |

OTHER PUBLICATIONS

Raheem, "ATM—Fraud Scare, Dispensing Errors, Unauthorised Debits Keep Customers Away", Dialog Accession No. 355820640, allAfrica.com, Jan. 17, 2014.*

* cited by examiner

110

111

112

Universal ATM Fraud Detection Computing Platform

Processor(s)

Memory(s)

Registration Module
112a

Historical Data Module
112b

Machine Learning Engine
112c

Fraud Detection Module
112d

Transaction Security Action Module
112e

ATM Security Action Module
112f

Database
112g

113

Communication Interface(s)

UNIVERSAL SELF-SERVICE KIOSK FRAUD DETECTION PLATFORM

BACKGROUND

Aspects of the disclosure relate to electrical computers, systems, and devices providing universal self-service kiosk fraud detection.

Self-service kiosks, such as automated teller machines (ATMs) and the like, are frequently used to conduct all manner of transactions. However, maintaining self-service kiosks can be costly and inefficient. Further, providing updates to functions at self-service kiosks, such as fraud detection, can be inefficient in currently systems. For instance, in conventional arrangements, fraud detection may be rules-based and unique to each individual financial institution associated with a self-service kiosk. In order to implement rules, a rule must be approved by an administrator, executed in a test environment and, upon receiving positive results, deployed to self-service kiosks. This can be a slow and expensive process that requires human input and provides inefficient flexibility in responding to detected instances of fraud (e.g., the conventional arrangements are slow to update and therefore slow to implement new rules related to newly identified fraud). Accordingly, it would be advantageous to provide a continuous learning model that leverages data from a plurality of entities to provide robust fraud detection parameters that detect fraud in real-time and update, in real-time, based on fraud determinations.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, scalable, and convenient technical solutions that address and overcome the technical issues associated with updating and maintaining self-service kiosks to efficiently detect fraud or potential fraud.

In some examples, a request for a transaction may be received via a self-service kiosk. The request for transaction may include transaction details, such as user, account, type of transaction, financial institution associated with the transaction, amount, and the like. In some examples, the financial institution may be identified as part of a consortium of financial institutions. Accordingly, a machine learning model particular to the consortium may be used to analyze the transaction to identify potential fraud.

For instance, the transaction details may be input to the machine learning model. Upon execution of the model, the model may output a determination of whether fraud or potential fraud exists in the transaction. In some examples, the machine learning model may be trained using historical transaction data from one or more financial institutions that are part of the consortium. If the machine learning model does not detect fraud, the transaction may be processed. If fraud or potential fraud is detected, one or more security actions may be identified and executed. For instance, one or more security actions associated with the transaction may be identified and executed. Additionally or alternatively, one or more additional self-service kiosks that may be impacted by the fraud may be identified. One or more self-service kiosk security actions may be identified and transmitted to the one or more additional self-service kiosks for execution.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As discussed above, maintaining self-service kiosks can be an expensive and inefficient process. As more users turn to self-service kiosks to conduct transactions, the need to quickly update and maintain self-service kiosks, particularly with respect to fraud detection in transactions, has increased. Accordingly, aspects described herein relate to real-time fraud detection using machine learning.

As discussed more fully herein, a consortium of financial institutions may join together to share or leverage historical data to train a machine learning model that may implement universal fraud detection parameters across self-service kiosks associated with the financial institutions of the consortium. Accordingly, a user associated with a financial institution of the consortium, or a user executing a transaction at a self-service kiosk associated with a financial institution of the consortium, may conduct transactions evaluated using the machine learning model unique to the consortium.

In some examples, detected fraud may cause identification of one or more security actions. For instance, security actions related to the transaction (e.g., hold on a check, denial of a request, limit of funds to withdraw, or the like) may be identified and executed by a self-service kiosk. Additionally or alternatively, other self-service kiosks within the consortium that may be impacted by detected fraud may be identified and one or more security actions associated with the other self-service kiosks may be executed.

These and various other arrangements will be discussed more fully below.

Figure 1A:
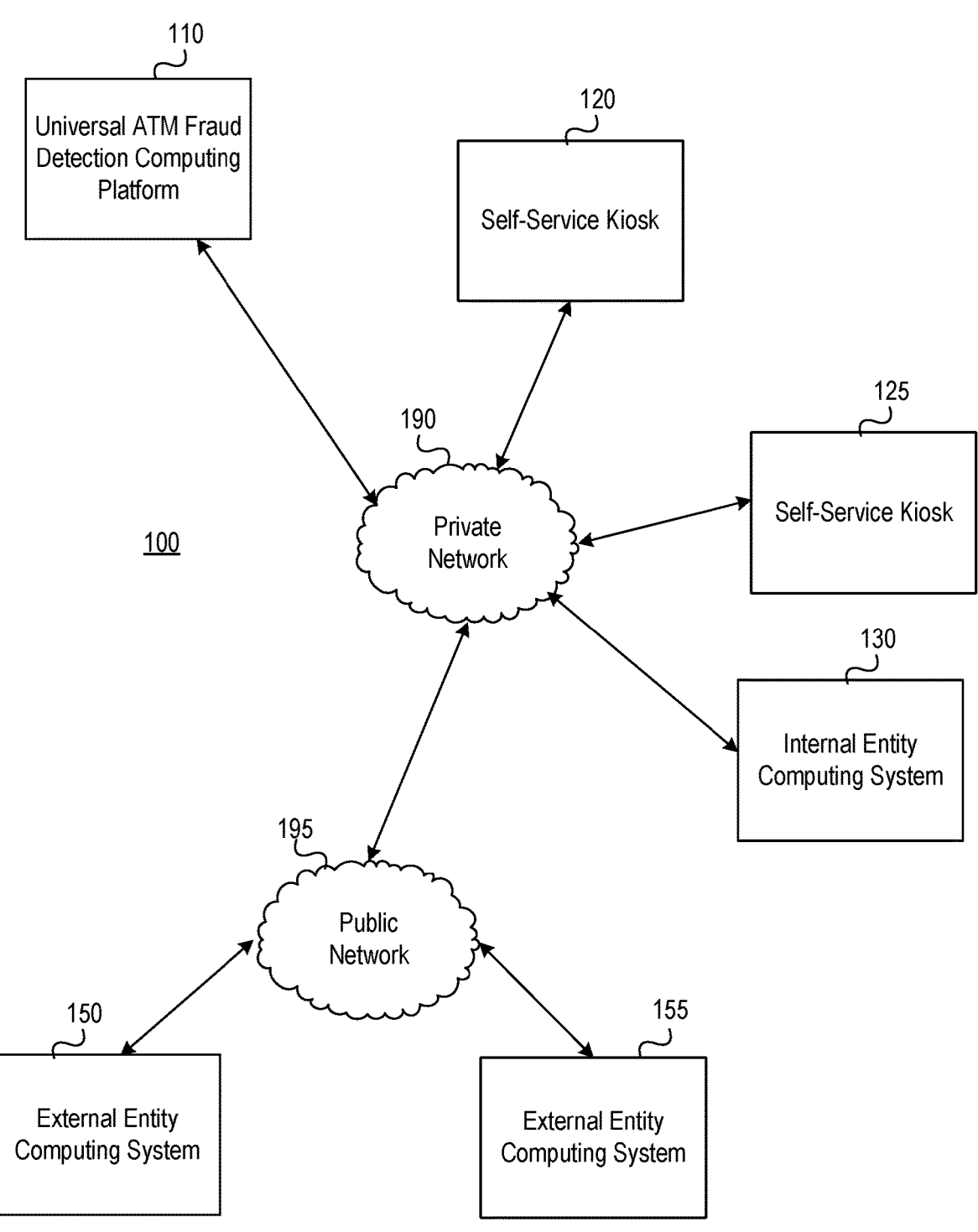
FIGS. 1A-1B depict an illustrative computing environment for implementing universal self-service kiosk fraud detection in accordance with one or more aspects described herein.
Figure 1B:
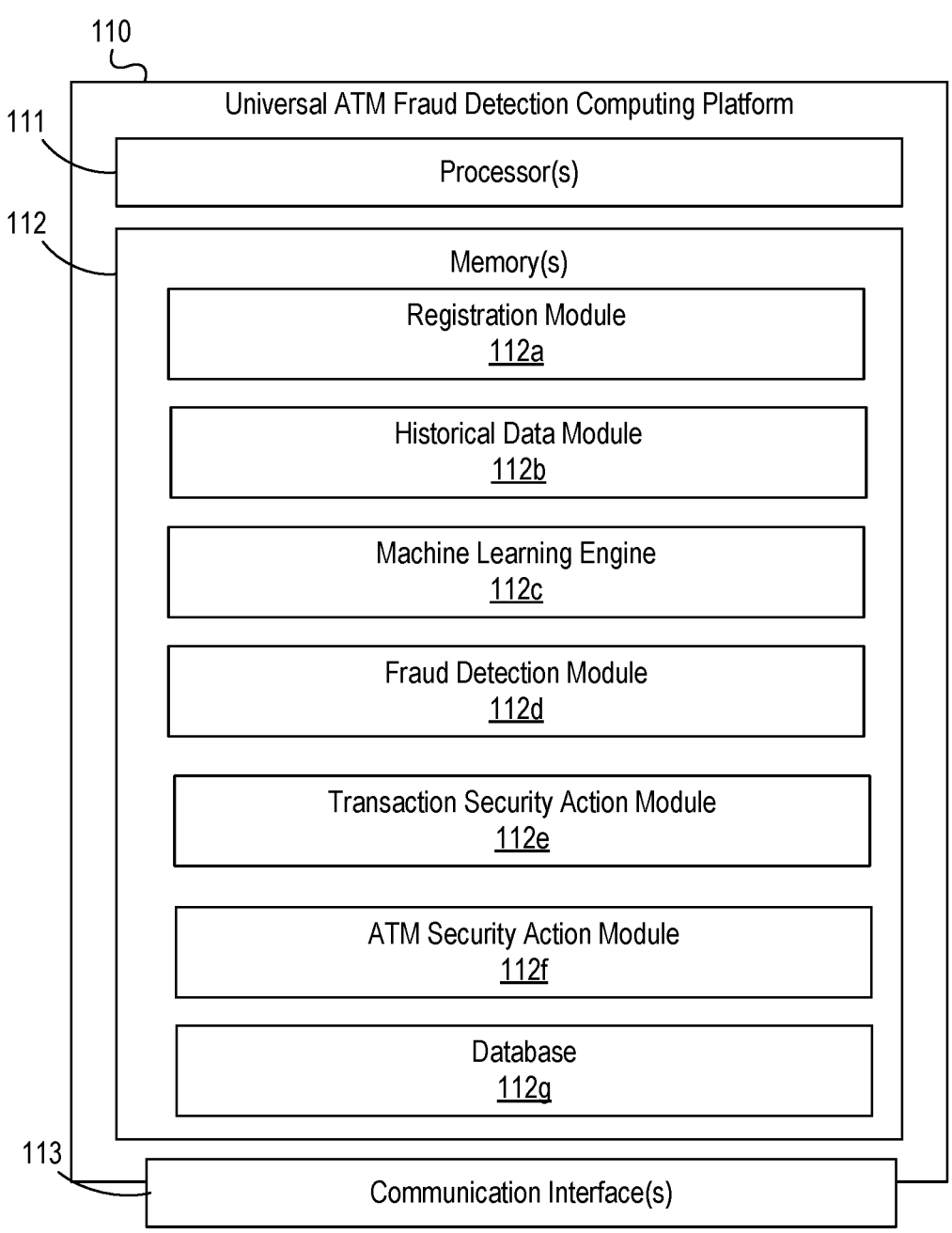

Accordingly, aspects described herein may be implemented using one or more computing devices operating in a computing environment. For instance, FIGS. 1A-1B depict an illustrative computing environment for implementing universal ATM fraud detection in accordance with one or more aspects described herein. Referring to FIG. 1A, computing environment 100 may include one or more computing devices and/or other computing systems. For example, computing environment 100 may include universal ATM fraud detection computing platform 110, self-service kiosk 120, self-service kiosk 125, internal entity computing system 130, external entity computing system 150 and external entity computing system 155. Although two self-service kiosks 120, 125, one internal entity computing system 130, and two external entity computing systems 150, 155 are shown, any number of devices or systems may be used without departing from the invention.

Universal ATM fraud detection computing platform 110 may be or include one or more computing devices (e.g., servers, server blades, or the like) and/or one or more computing components (e.g., memory, processor, and the like) and may be configured to provide dynamic, efficient universal fraud detection for entities associated with a consortium via a self-service kiosk, such as an automated teller machine (ATM). For instance, universal ATM fraud detection computing platform 110 may access a cloud-based machine learning model configured to evaluate transactions conducted at the self-service kiosk to determine whether there is potential fraud in the transaction. In some examples, the machine learning model may be trained using historical data received from a plurality of entities or enterprise organizations that are part of a consortium of enterprise organizations within an industry. For instance, a consortium of financial institutions may pool historical transaction and/ or fraud data to train the machine leaning model. In some examples, training data may be received from 3, 5 or 7 enterprise organizations within the consortium. In some examples, the training data may be received from a subset of enterprise organizations within the consortium (e.g., fewer than all).

The historical data may be used to train the machine learning model which may then be executed upon receiving a request for a transaction. The machine learning model may compare transaction details of a requested transaction to historical or training data to detect a pattern indicative of potential fraud. If a pattern is detected, the universal ATM fraud detection computing platform 110 may identify one or more transaction security actions and/or one or more self-service kiosk security actions to execute. For instance, the universal ATM fraud detection computing platform 110 may reject a requested transaction as part of a transaction security action. Further, an instruction causing other self-service kiosks within a geographic area to recognize the user associated with the rejected transaction may be generated and transmitted to self-service kiosks within the geographic area that are associated with the consortium.

The universal ATM fraud detection computing platform 110 may employ a dynamic feedback loop that continuously updates and/or validates the machine learning model based on transaction data, fraud decisions related to the transactions, and the like. Accordingly, the model may be continuously and efficiently updated to quickly identify new occurrences of fraud. Further, because the machine learning model is a cloud-based model executed for self-service kiosk transactions associated with all enterprise organizations within the consortium, identified occurrences of fraud may be quickly communicated to other enterprise organizations to avoid occurrences of fraud and further protect the consumer.

Self-service kiosk 120 and/or self-service kiosk 125 may be or include one or more computing devices (e.g., servers, server blades, or the like) and/or one or more computing components (e.g., memory, processor, and the like) and may be configured to receive and process transaction requests (e.g., cash withdrawals, balance transfers, deposits, or the like). Self-service kiosk 120 and/or self-service kiosk 125 may include automated teller machines (ATMs), automated teller assistants (ATAs), self-service point-of-sale systems, or the like. Self-service kiosk 120 and/or self-service kiosk 125 may be associated or affiliated with one or more enterprise organizations within a consortium. In some examples, self-service kiosk 120 and self-service kiosk 125 may be associated with a same enterprise organization. Alternatively, self-service kiosk 120 and self-service kiosk 125 may be associated with different enterprise organizations of the consortium.

Self-service kiosk 120 and self-service kiosk 125 may be configured to provide transaction associated to users who may or might not be customers of one or more enterprise organizations of the consortium. For instance, self-service kiosk 120 and/or self-service kiosk 125 may be configured to provide transaction such as deposits, cash withdrawals, funds transfers between accounts, balance inquiries, and the like. While self-service kiosk 120 and self-service kiosk 125 are shown as connected via a private network 190, in some examples, the self-service kiosk 120 and/or self-service kiosk 125 may be connected via public network 195.

Internal entity computing system 130 may be or include one or more computing devices (e.g., servers, server blades, or the like) and/or one or more computing components (e.g., memory, processor, and the like) and may be configured to store historical transaction data of users of a first enterprise organization (e.g., an enterprise organization implementing the universal ATM fraud detection computing platform 110), fraud data associated with historical transactions, and the like. The internal entity computing system 130 may be internal to or associated with the first enterprise organization that is part of a consortium of enterprise organizations.

External entity computing system 150 and/or external entity computing system 155 may be or include or more computing devices (e.g., servers, server blades, or the like) and/or one or more computing components (e.g., memory, processor, and the like) and may be configured to store historical transaction data of users of a respective enterprise organization (e.g., a second enterprise organization within the consortium, a third enterprise organization within the consortium, and the like), fraud data associated with historical transactions, and the like. External entity computing system 150 may be associated with a second enterprise organization while external entity computing system 155 may be associated with a third enterprise organization different from the first and second enterprise organizations. Alternatively, external entity computing system 150 may be associated with a same enterprise organization as external entity computing system 155.

As mentioned above, computing environment 100 also may include one or more networks, which may interconnect one or more of universal ATM fraud detection computing platform 110, self-service kiosk 120, self-service kiosk 125, internal entity computing system 130, external entity computing system 150 and/or external entity computing system 155. For example, computing environment 100 may include private network 190 and public network 195. Private network 190 and/or public network 195 may include one or more sub-networks (e.g., Local Area Networks (LANs), Wide Area Networks (WANs), or the like). Private network 190 may be associated with a particular organization (e.g., a corporation, financial institution, educational institution, governmental institution, or the like) and may interconnect one or more computing devices associated with the organization. For example, universal ATM fraud detection computing platform 110, self-service kiosk 120, self-service kiosk 125, and internal entity computing system 130, may be associated with an enterprise organization (e.g., a financial institution), and private network 190 may be associated with and/or operated by the organization, and may include one or more networks (e.g., LANs, WANs, virtual private networks (VPNs), or the like) that interconnect universal ATM fraud detection computing platform 110, self-service kiosk 120, self-service kiosk 125, and internal entity computing system 130, and one or more other computing devices and/or computer systems that are used by, operated by, and/or otherwise associated with the organization. Public network 195 may connect private network 190 and/or one or more computing devices connected thereto (e.g., universal ATM fraud detection computing platform 110, self-service kiosk 120, self-service kiosk 125, and internal entity computing system 130) with one or more networks and/or computing devices that are not associated with the organization. For example, external entity computing system 150 and/or external entity computing system 155 might not be associated with an organization that operates private network 190 (e.g., because external entity computing system 150 and/or external entity computing system 155 may be owned, operated, and/or serviced by one or more entities different from the organization that operates private network 190, one or more customers of the organization, one or more employees of the organization, public or government entities, and/or vendors of the organization, rather than being owned and/or operated by the organization itself), and public network 195 may include one or more networks (e.g., the internet) that connect external entity computing system 150 and/or external entity computing system 155 to private network 190 and/or one or more computing devices connected thereto (e.g., universal ATM fraud detection computing platform 110, self-service kiosk 120, self-service kiosk 125, and internal entity computing system 130). Further, one or more of self-service kiosk 120 or self-service kiosk 125, or one or more additional self-service kiosks, may be connected via public network 195 without departing from the invention.

Referring to FIG. 1B, universal ATM fraud detection computing platform 110 may include one or more processors 111, memory 112, and communication interface 113. A data bus may interconnect processor(s) 111, memory 112, and communication interface 113.

Communication interface 113 may be a network interface configured to support communication between universal ATM fraud detection computing platform 110 and one or more networks (e.g., network 190, network 195, or the like). Memory 112 may include one or more program modules having instructions that when executed by processor(s) 111 cause universal ATM fraud detection computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of universal ATM fraud detection computing platform 110 and/or by different computing devices that may form and/or otherwise make up universal ATM fraud detection computing platform 110.

For example, memory 112 may have, store and/or include registration module 112a. Registration module 112a may store instructions and/or data that may cause or enable the universal ATM fraud detection computing platform 110 to receive a request to register with the consortium. The request may be received from an enterprise organization. Upon registering with the universal ATM fraud detection computing platform 110, the enterprise organization may be part of the consortium and the universal fraud detection model may be used to evaluate transactions received at one or more self-service kiosk for fraud.

Universal ATM fraud detection computing platform 110 may further have, store and/or include historical data module 112b. Historical data module 112b may store instructions and/or data that may cause or enable the universal ATM fraud detection computing platform 110 to receive historical or training data related to transactions, detected fraud, non-fraudulent transactions, and the like. In some examples, the historical data may be received from a plurality of sources, such as internal entity computing system 130, external entity computing system 150, and/or external entity computing system 155. In some examples, historical data may be received from fewer than all enterprise organizations within the consortium. The historical data may then be used to train a machine learning model.

Accordingly, universal ATM fraud detection computing platform 110 may further have, store and/or include machine learning engine 112c. Machine learning engine 112c may store instructions and/or data that may cause or enable the universal ATM fraud detection computing platform 110 to train, execute, validate and/or update one or more machine learning models that may be used to evaluate transactions received at a self-service kiosk in real-time or near real-time to determine whether the transaction is potentially fraudulent. In some examples, the machine learning model may be trained using the historical data received from one or more sources (e.g., internal sources and/or external sources). For instance, the machine learning model may be trained using labelled data from historical transactions that indicate whether a particular transaction was fraudulent or not fraudulent. Accordingly, the machine learning model may learn to recognize patterns within data that may be used to evaluate a current transaction to determine whether it is potentially fraudulent. In some examples, based on a detected pattern in a current transaction that indicates fraud or potential fraud, the machine learning model may output an indication of fraud or potential fraud. In some examples, the machine learning model may output an instruction or command to mitigate impact of the fraud or potential fraud. In some examples, that may include actions executed by a self-service kiosk associated with the transaction, and/or other self-service kiosks associated with the consortium.

Accordingly, the machine learning model may use, as inputs, transaction details associated with a current transaction (e.g., customer name, account number, current balance, type of transaction, image data associated with a transaction, image data captured around the self-service kiosk, audio data from an area around the self-service kiosk, and the like). The model may be executed to output a fraud/not fraud decision, and/or one or more security actions.

In some examples, a dynamic feedback loop may be used to continuously update or validate the machine learning model. For instance, an output of an evaluated transaction, security actions executed, and the like, may be fed into the machine learning model in a dynamic feedback loop that continuously improves accuracy of the model.

In some examples, the machine learning model may be or include one or more supervised learning models (e.g., decision trees, bagging, boosting, random forest, neural networks, linear regression, artificial neural networks, logical regression, support vector machines, and/or other models), unsupervised learning models (e.g., clustering, anomaly detection, artificial neural networks, and/or other models), knowledge graphs, simulated annealing algorithms, hybrid quantum computing models, and/or other models. In some examples, training the machine learning model may include training the model using labeled data and/or unlabeled data.

Universal ATM fraud detection computing platform 110 may further have, store and/or include fraud detection module 112d. Fraud detection module 112d may store instructions and/or data that may cause or enable the universal ATM fraud detection computing platform 110 to receive an output from the machine learning engine 112c of fraud/not fraud and generate one or more notifications based on the output. For instance, fraud detection module 112d may generate one or more notifications indicating that fraud or potential fraud has been detected and may transmit the notifications to one or more devices (e.g., self-service kiosk 120, 125, a user device, an enterprise organization device, or the like).

Universal ATM fraud detection computing platform 110 may further have, store and/or include transaction security action module 112e. Transaction security action module 112e may store instructions and/or data that may cause or enable the universal ATM fraud detection computing platform 110 to generate a recommended transaction security action (e.g., based on a fraud/not fraud output from the machine learning engine 112c), receive a recommended transaction security action from the machine learning engine 112c, or the like, and generate an instruction or command causing execution of the transaction security action. For instance, if fraud is detected, transaction security action module 112e may generate an instruction preventing the self-service kiosk from processing the transaction and may transmit the instruction to the self-service kiosk for execution. In some examples, the instruction preventing execution of the transaction may include additional security actions, such as holding a check used in the transaction, holding a card used in the transaction, or the like.

Universal ATM fraud detection computing platform 110 may further have, store and/or include ATM security action module 112f. ATM security action module 112f may store instructions and/or data that may cause or enable the universal ATM fraud detection computing platform 110 to generate a recommended self-service kiosk security action (e.g., based on a fraud/not fraud output from the machine learning engine 112c), receive a recommended self-service kiosk security action from the machine learning engine 112c, or the like, and generate an instruction or command causing execution of the self-service kiosk security action. For instance, if fraud is detected, ATM security action module 112f may identify an impacted self-service kiosk, as well as one or more potentially impacted self-service kiosks (e.g., other self-service kiosks of a similar type of configuration, self-service kiosks within a predefined distance or geo-location of an impacted self-service kiosk, or the like), and generate an instruction or command causing execution of a self-service kiosk security action at one or more of the identified self-service kiosks. For instance, a kiosk vestibule may be locked to prevent others from attempting to use the self-service kiosk, a self-service kiosk may be disabled to prevent further use, one or more audio or image capture devices near a self-service kiosk may be activated to capture and record audio and/or video signals in a vicinity of the self-service kiosk, or the like.

Universal ATM fraud detection computing platform 110 may further have, store and/or include a database 112g. Database 112g may store data associated with historical transactions, evaluated transactions, registration data, and/or other data that enables performance of the aspects described herein by the universal ATM fraud detection computing platform 110.

FIGS. 2A-2G depict one example illustrative event sequence for implementing universal ATM fraud detection in accordance with one or more aspects described herein. The events shown in the illustrative event sequence are merely one example sequence and additional events may be added, or events may be omitted, without departing from the invention. Further, one or more processes discussed with respect to FIGS. 2A-2G may be performed in real-time or near real-time.

Figure 2A:
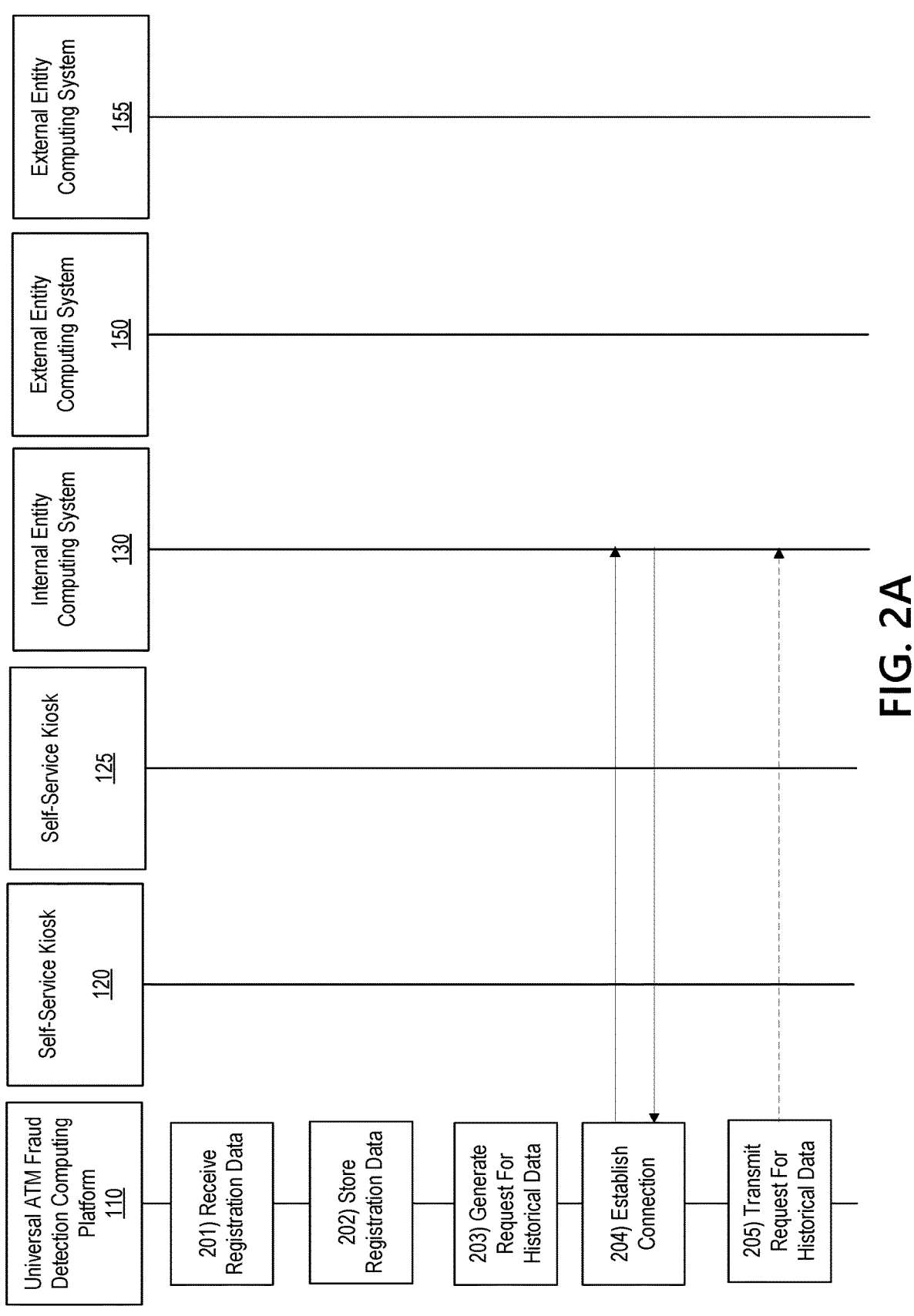
FIGS. 2A-2G depict an illustrative event sequence for implementing universal self-service kiosk fraud detection in accordance with one or more aspects described herein.

With reference to FIG. 2A, at step 201, universal ATM fraud detection computing platform 110 may receive registration data. For instance, an enterprise organization may desire to join a consortium of other enterprise organizations and/or a plurality of enterprise organizations may desire to create a consortium. Accordingly, the enterprise organization(s) may provide registration data to the universal ATM fraud detection computing platform 110 that may include identification of the enterprise organization(s), identification of one or more self-service kiosks associated with the enterprise organization(s), or the like.

At step 202, universal ATM fraud detection computing platform 110 may store the registration data. For instance, the universal ATM fraud detection computing platform 110 may modify a database to include the enterprise organization(s), identified self-service kiosks, and the like. In some examples, storing the registration data may include associating the enterprise organization(s) with the consortium which may cause execution of the fraud detection machine learning model at self-service kiosk associated with the enterprise organization(s) that have been identified.

At step 203, universal ATM fraud detection computing platform 110 may generate a request for historical data. For instance, universal ATM fraud detection computing platform 110 may generate a request for historical transaction data that may include both fraudulent activity and non-fraudulent activity. The generated request for historical data may then be transmitted to one or more enterprise organization systems. In some examples, the generated request for historical data may be transmitted to fewer than all enterprise organizations within the consortium (e.g., 3 entities, 5 entities, or the like).

At step 204, universal ATM fraud detection computing platform 110 may establish a connection with the internal entity computing system 130. For instance, a first wireless connection may be established between the universal ATM fraud detection computing platform 110 and the internal entity computing system 130. Upon establishing the first wireless connection, a communication session may be initiated between the universal ATM fraud detection computing platform 110 and the internal entity computing system.

At step 205, universal ATM fraud detection computing platform 110 may transmit or send the request for historical data to the internal entity computing system 130. For instance, the universal ATM fraud detection computing platform 110 may send the request for historical data during the communication session initiated upon establishing the first wireless connection.

Figure 2B:
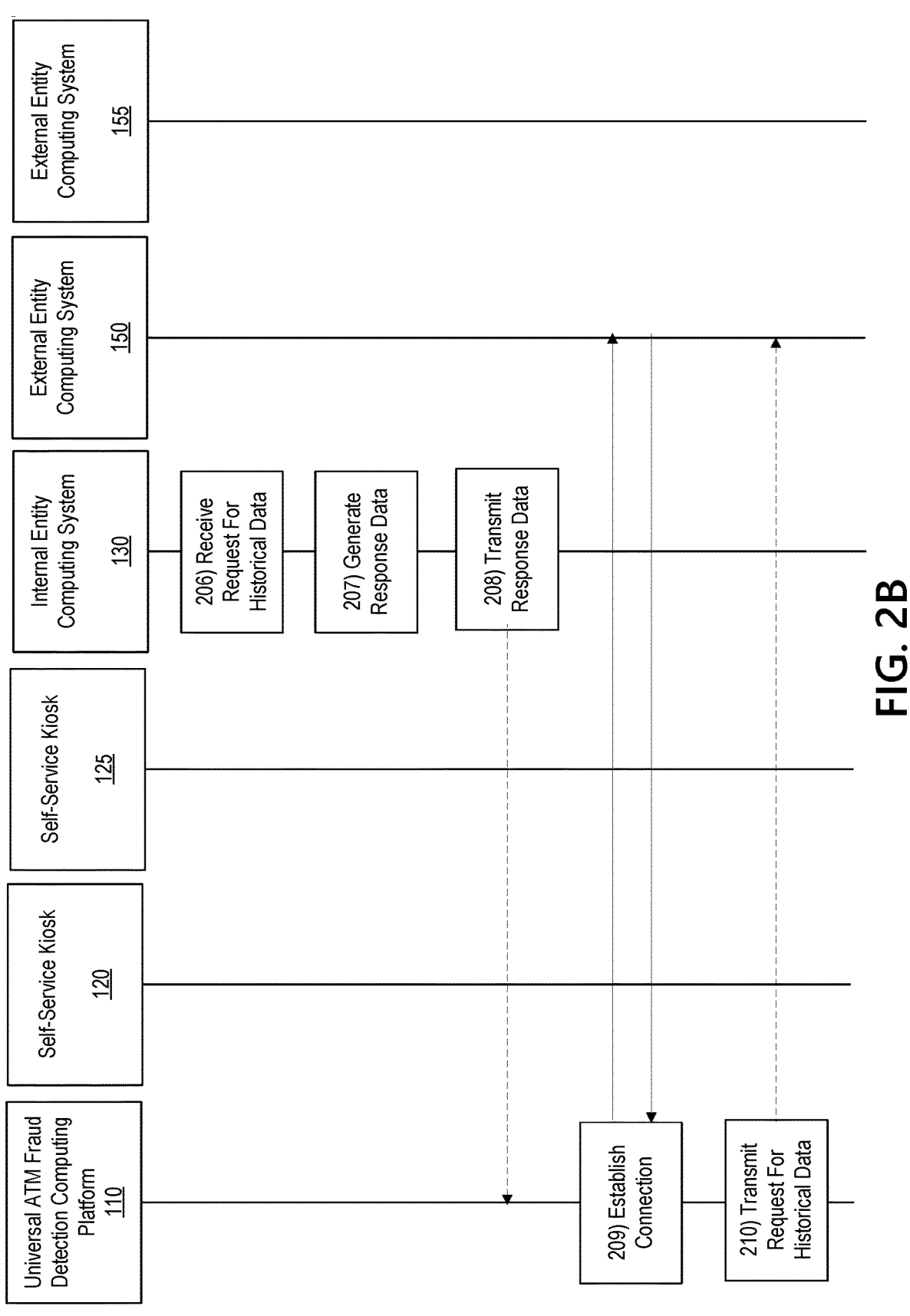

With reference to FIG. 2B, at step 206, internal entity computing system 130 may receive and execute the request for historical data. For instance, in executing the request for historical data, transaction data including fraudulent and non-fraudulent transactions may be identified.

At step 207, internal entity computing system 130 may generate response data responsive to the request for historical data. For instance, the identified transaction data may be used to generate response data.

At step 208, internal entity computing system 130 may transmit or send the response data to the universal ATM fraud detection computing platform 110.

At step 209, universal ATM fraud detection computing platform 110 may establish a connection with the external entity computing system 150. For instance, a second wireless connection may be established between the universal ATM fraud detection computing platform 110 and the external entity computing system 150. Upon establishing the second wireless connection, a communication session may be initiated between the universal ATM fraud detection computing platform 110 and the external entity computing system 150.

At step 210, universal ATM fraud detection computing platform 110 may transmit or send the request for historical data to the external entity computing system 150. For instance, the universal ATM fraud detection computing platform 110 may send the request for historical data during the communication session initiated upon establishing the second wireless connection.

Figure 2C:
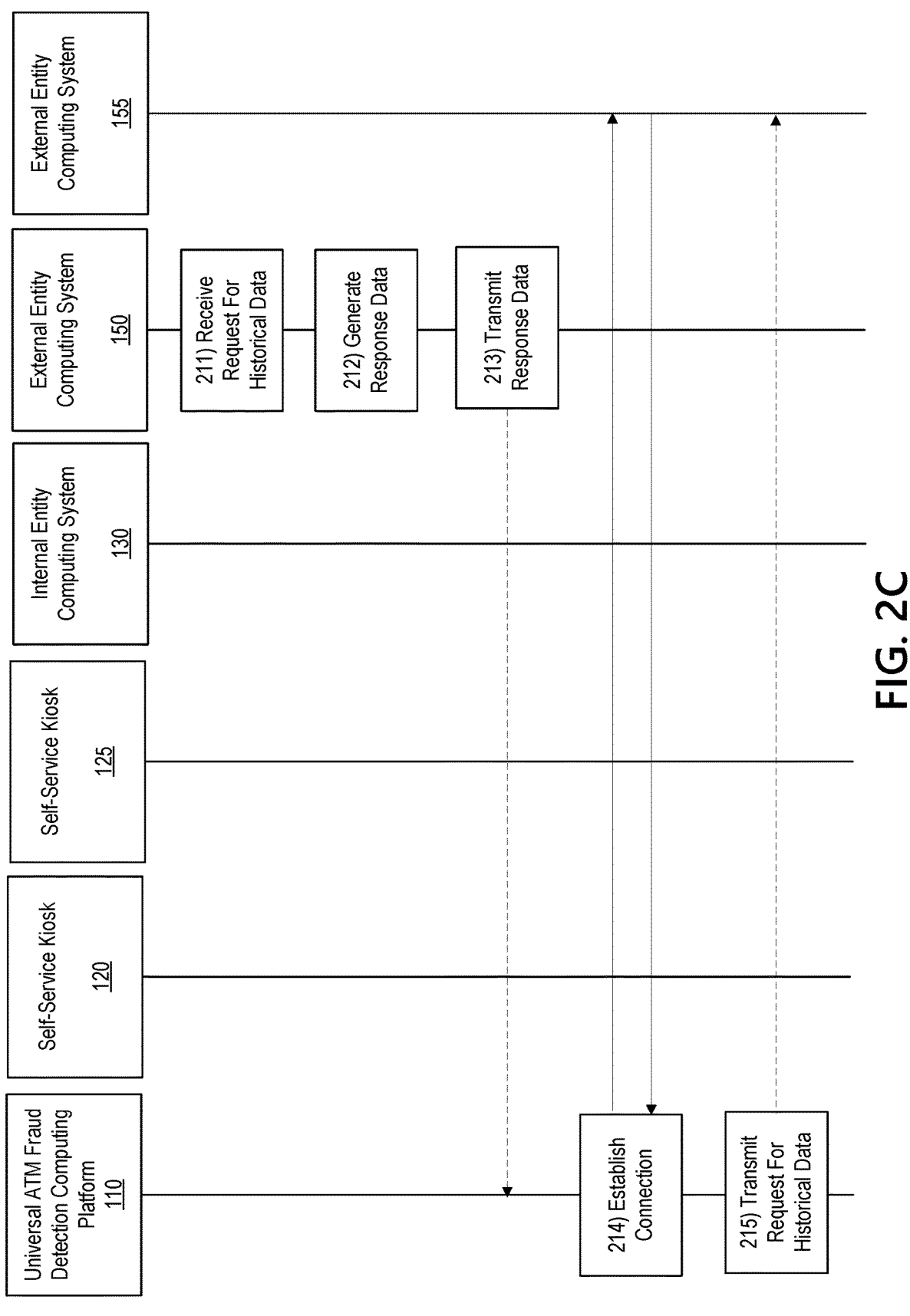

With reference to FIG. 2C, at step 211, external entity computing system 150 may receive and execute the request for historical data. For instance, in executing the request for historical data, transaction data including fraudulent and non-fraudulent transactions may be identified.

At step 212, external entity computing system 150 may generate response data responsive to the request for historical data. For instance, the identified transaction data may be used to generate response data.

At step 213, external entity computing system 150 may transmit or send the response data to the universal ATM fraud detection computing platform 110.

At step 214, universal ATM fraud detection computing platform 110 may establish a connection with the external entity computing system 155. For instance, a third wireless connection may be established between the universal ATM fraud detection computing platform 110 and the external entity computing system 155. Upon establishing the third wireless connection, a communication session may be initiated between the universal ATM fraud detection computing platform 110 and the external entity computing system 155.

At step 215, universal ATM fraud detection computing platform 110 may transmit or send the request for historical data to the external entity computing system 155. For instance, the universal ATM fraud detection computing platform 110 may send the request for historical data during the communication session initiated upon establishing the third wireless connection.

Figure 2D:
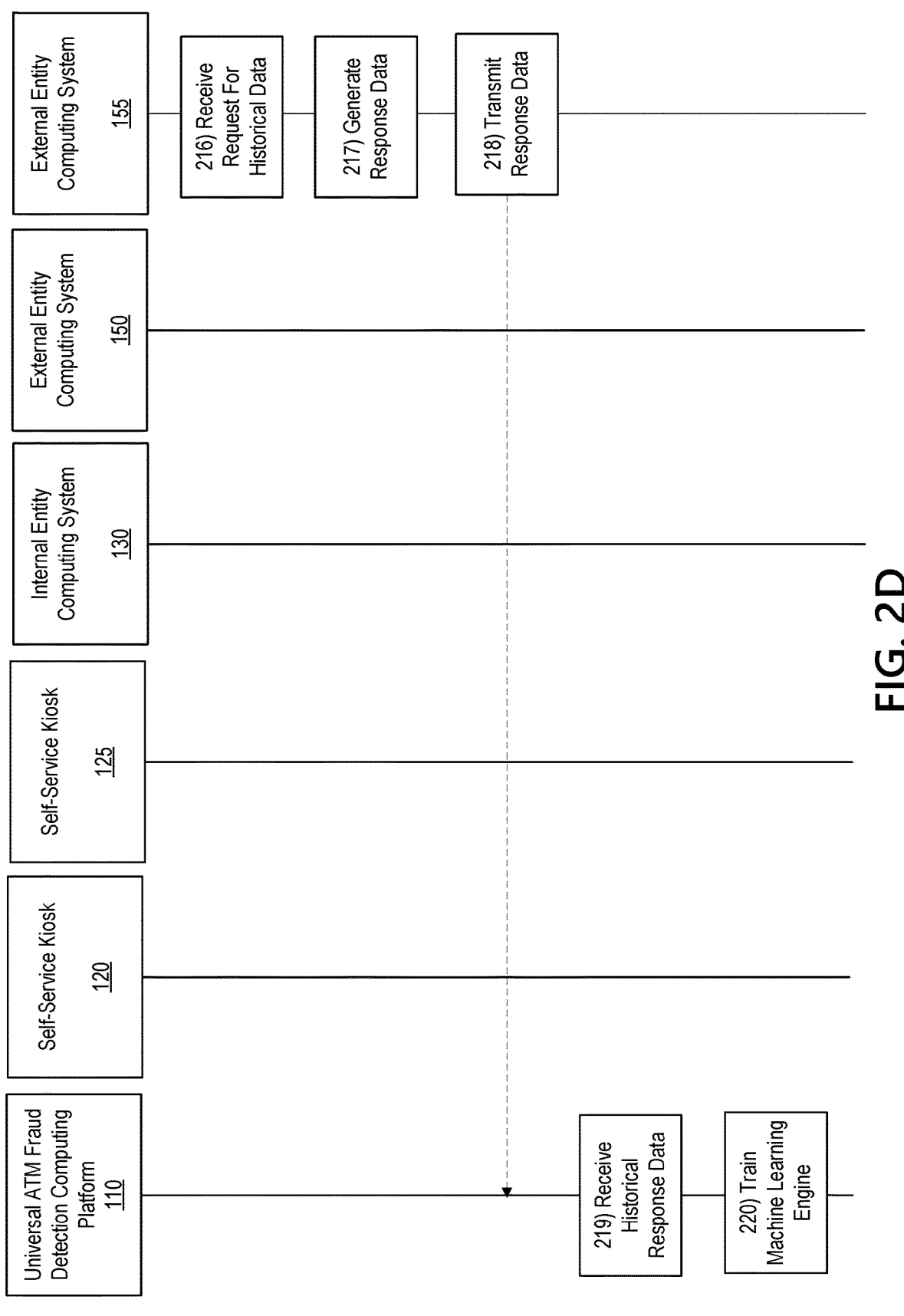

With reference to FIG. 2D, at step 216, external entity computing system 155 may receive and execute the request for historical data. For instance, in executing the request for historical data, transaction data including fraudulent and non-fraudulent transactions may be identified.

At step 217, external entity computing system 155 may generate response data responsive to the request for historical data. For instance, the identified transaction data may be used to generate response data.

At step 218, external entity computing system 155 may transmit or send the response data to the universal ATM fraud detection computing platform 110.

At step 219, universal ATM fraud detection computing platform 110 may receive the historical response data generated by each of the internal entity computing system 130, external entity computing system 150 and external entity computing system 155. In some examples, historical data from more of fewer systems may be received and used to train the machine learning model.

At step 220, universal ATM fraud detection computing platform 110 may train a machine learning model. For instance, universal ATM fraud detection computing platform 110 may train, using the historical response data including both fraudulent and non-fraudulent transaction data, the machine learning model to generate a determination of whether fraud or potential fraud exists in a self-service kiosk transaction. The machine learning model may be trained to use, as inputs, transaction data from a self-service kiosk transaction, such as a cash deposit, check deposit, withdrawal, funds transfer, or the like. The transaction data may be analyzed using the trained machine learning model to identify patterns or sequences in the transaction data that may indicate fraudulent activity.

In some examples, the machine learning model may be further trained to identify one or more security actions, including, for instance, transaction security actions, self-service kiosk security actions, and the like. For instance, if a fraudulent pattern is detected, the machine learning model may output a security action to break the fraudulent pattern. For example, if a known fraudulent actor attempts a withdrawal at a first self-service kiosk (e.g., the fraudulent actor being known from a list of known fraudulent actors ingested via the historical transaction data or determined from the historical transaction data), the machine learning model may identify the fraudulent pattern and indicate the requested transaction is or may be fraudulent. Accordingly, the machine learning model may, in some examples, generate a transaction security action that may cause the first self-service kiosk to deny the requested withdrawal. Additionally or alternatively, the machine learning model may identify additional or other self-service kiosks within a predefined distance of geo-location of the first self-service kiosk and may cause the additional self-service kiosks to initiate one or more security actions (e.g., activating a camera in an area around the self-service kiosks, activating a microphone in an area around the self-service kiosks, disabling one or more functions of the self-service kiosks, generating an alert to take action if the fraudulent actor attempts another transaction, or the like).

Figure 2E:
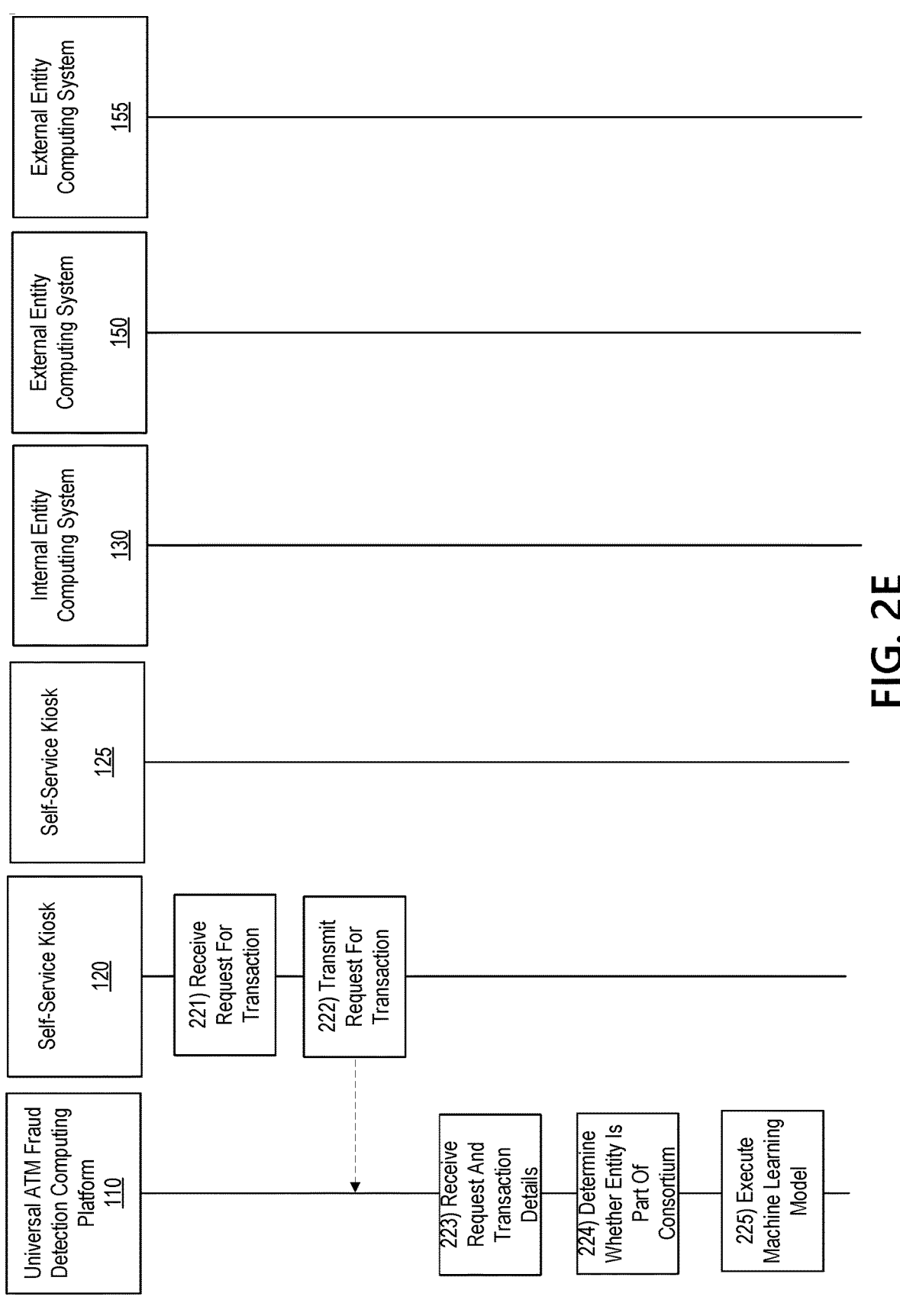

With reference to FIG. 2E, at step 221, self-service kiosk 120 may receive a request for transaction. In some examples, the request for transaction details such as identification of the user requesting the transaction, an account for the transaction, a type of transaction, a location of the self-service kiosk, a financial institution or enterprise organization associated with the user or account, image data associated with the transaction, and the like.

At step 222, self-service kiosk 120 may transmit or send the request for transaction, including transaction details, to the universal ATM fraud detection computing platform 110.

At step 223, the universal ATM fraud detection computing platform 110 may receive the request for transaction and associated transaction details.

At step 224, universal ATM fraud detection computing platform 110 may analyze the transaction details to determine whether the user is associated with an enterprise organization that is part of the consortium. For instance, universal ATM fraud detection computing platform 110 may determine whether the account associated with the transaction is held by an enterprise organization that is part of the consortium. If so, the machine learning model trained based on data from the various enterprise organizations may be used to evaluate the transaction. If not, the transaction may be evaluated using fraud detection rules, models, or the like, associated with the enterprise organization of the user, the enterprise organization of the self-service kiosk, or the like. In some examples, step 224 may be optional and all transactions requested at the self-service kiosk 120 that is associated with the consortium may be evaluated using the machine learning model of the consortium.

At step 225, universal ATM fraud detection computing platform 110 may execute the machine learning model. For instance, the universal ATM fraud detection computing platform 110 may input, to the machine learning model, the transaction details. The model may be executed to output a determination of whether the transaction is fraudulent or potentially fraudulent. If no fraud is detected, the transaction may be processed by the self-service kiosk 120 (e.g., based on a notification or instruction from the universal ATM fraud detection computing platform 110 that fraud was not detected) and the process may end.

Figure 2F:
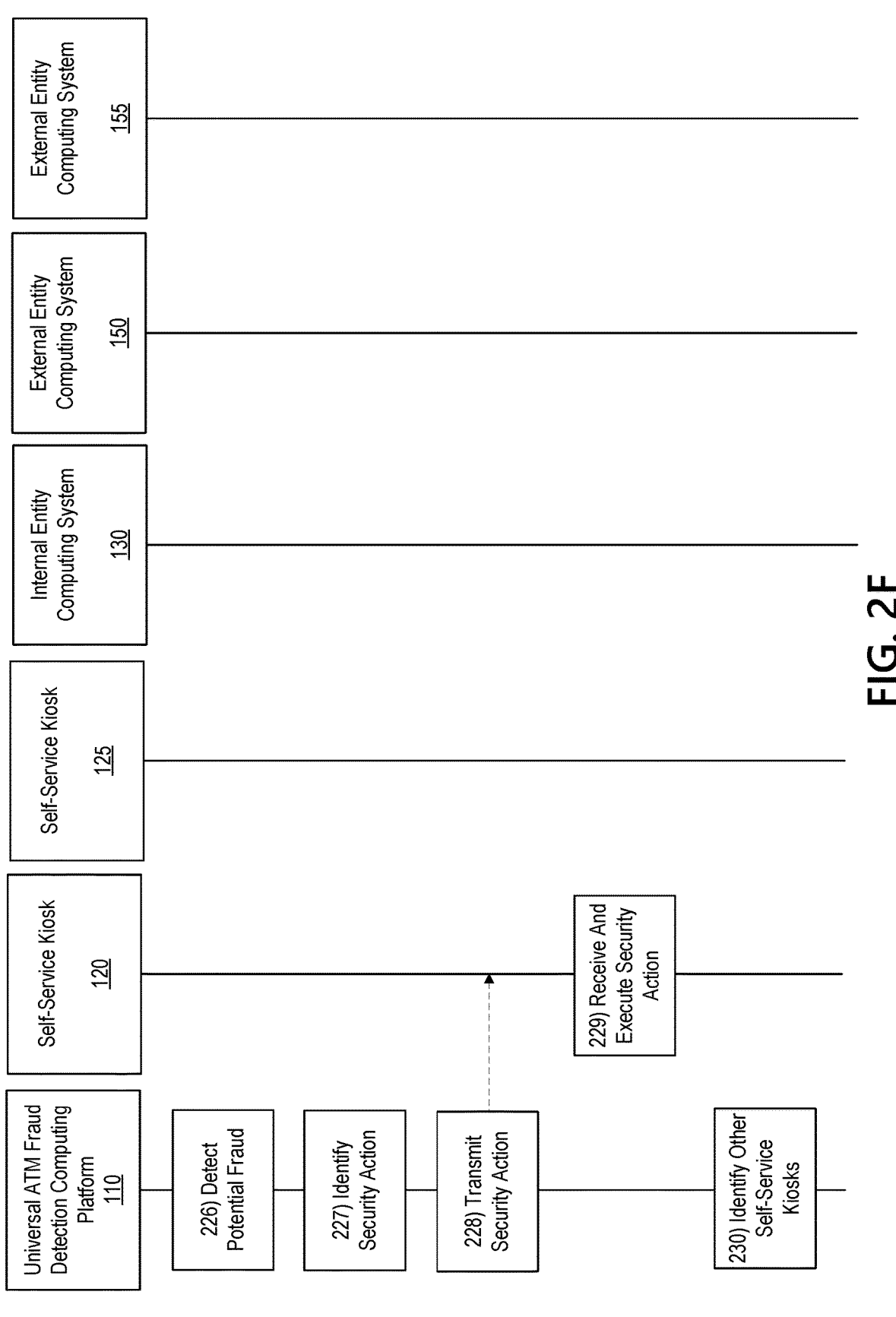

With reference to FIG. 2F, at step 226, the machine learning model may output a determination that fraud or potential fraud is detected in the transaction. For instance, the machine learning model may analyze the transaction details to detect a pattern that indicates fraud or potential fraud.

At step 227, universal ATM fraud detection computing platform 110 may identify one or more security actions. For instance, universal ATM fraud detection computing platform 110 may identify one or more transaction security actions and/or self-service kiosk security actions. In some examples, the identified security action(s) may be output by the machine learning model (e.g., based on a detection of fraud or potential fraud). Additionally or alternatively, the one or more security actions may be identified by the universal ATM fraud detection computing platform 110.

At step 228, the universal ATM fraud detection computing platform 110 may transmit or send an identified security action to the self-service kiosk 120 at which the transaction was requested. In some examples, the security action may be transaction security action identified in response to fraud or potential fraud identified in the transaction. The transaction security action may be a security action directly related to the transaction (e.g., denial of the requested transaction, distribution of less than requested amount of funds, hold on the transaction, hold on a card of the user, or the like). In some examples, sending the security action may including sending an instruction causing the self-service kiosk to execute the security action.

In some examples, transmitting or sending the security action may cause the self-service kiosk 120 to execute the security action. For instance, at step 229, self-service kiosk 120 may receive and execute the security action sent by the universal ATM fraud detection computing platform 110.

At step 230, universal ATM fraud detection computing platform 110 may identify one or more additional or other self-service kiosks for which a security action should be executed. For instance, universal ATM fraud detection computing platform 110 may identify one or more additional or other self-service kiosks, such as self-service kiosk 125, that may be a potential target for the unauthorized user that attempted the fraudulent transaction at self-service kiosk 120, may be within a predetermined distance or geo-location of the self-service kiosk 120, or the like. In some examples, identifying additional or other self-service kiosks may include identifying a self-service kiosk security action for execution by the one or more additional or other self-service kiosks.

Figure 2G:
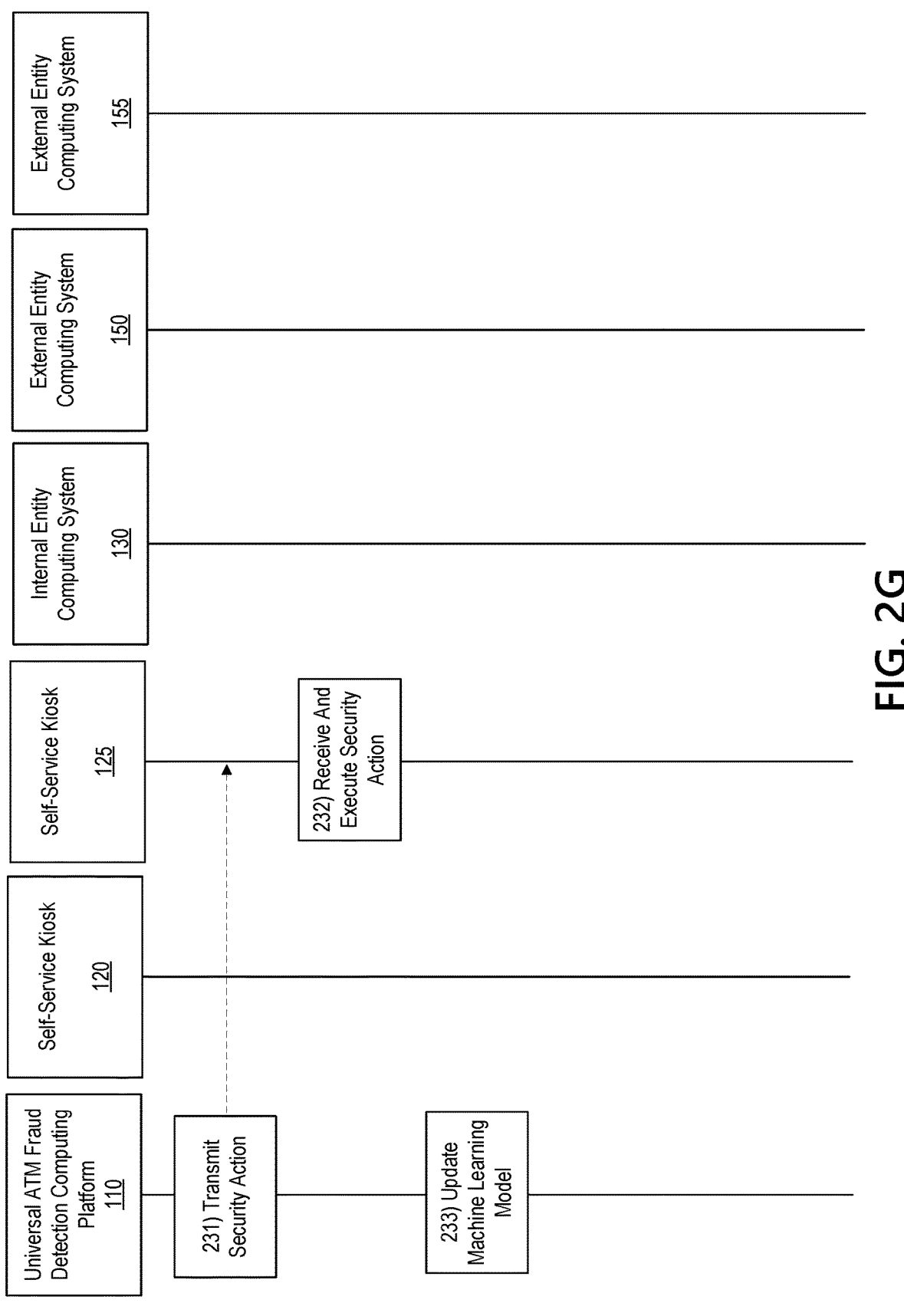

With reference to FIG. 2G, at step 231, universal ATM fraud detection computing platform 110 may transmit or send the self-service kiosk security action to the identified one or more additional or other self-service kiosks, such as self-service kiosk 125. The self-service kiosk security action may be a security action generated to mitigate impact of or avoid impact of potential fraud similar to the fraud detected at the self-service kiosk 120. Accordingly, the self-service kiosk security action may include one or more actions to protect the identified one or more other or additional self-service kiosks, such as disabling a function, activating one or more cameras or microphones near the other or additional self-service kiosks, or the like. In some examples, sending the security action may including sending an instruction causing the one or more additional or other self-service kiosks to execute the security action.

In some examples, transmitting or sending the security action may cause the one or more other or additional self-service kiosks, such as self-service kiosk 125, to execute the security action. For instance, at step 232, self-service kiosk 125 may receive and execute the security action sent by the universal ATM fraud detection computing platform 110.

At step 233, universal ATM fraud detection computing platform 110 may update the machine learning model. For instance, based on the evaluation of the transaction (e.g., determination of fraud/no fraud, identification of security actions, and the like), the universal ATM fraud detection computing platform 110 may update or validate the machine learning model. Accordingly, the model may be continuously updated to improve accuracy of fraud detection in transactions, improve identification of security actions, optimize model outputs, and the like.

Figure 3:
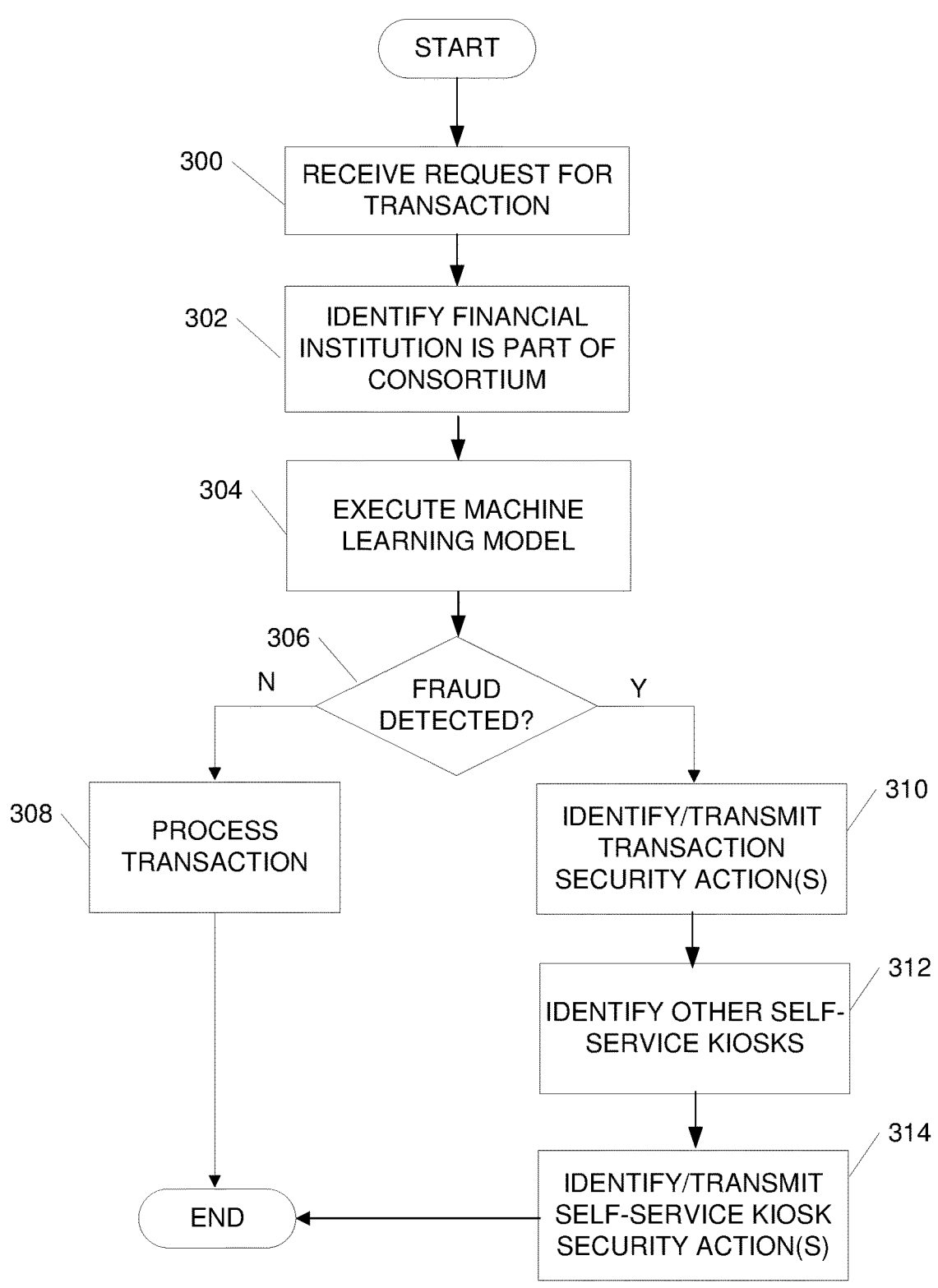
FIG. 3 depicts an illustrative method for implementing universal self-service kiosk fraud detection in accordance with one or more aspects described herein.

FIG. 3 is a flow chart illustrating one example method of universal ATM fraud detection in accordance with one or more aspects described herein. The processes illustrated in FIG. 3 are merely some example processes and functions. The steps shown may be performed in the order shown, in a different order, more steps may be added, or one or more steps may be omitted, without departing from the invention. In some examples, one or more steps may be performed simultaneously with other steps shown and described. One of more steps shown in FIG. 3 may be performed in real-time or near real-time.

At step 300, a computing platform may receive, via a self-service kiosk, a request for a transaction. In some examples, the request for a transaction includes transaction details such as type of transaction, amount of transaction, user and/or account associated with the transaction, financial institution associated with the account, image data associated with the transaction, and the like.

At step 302, the computing platform may identify, from the request for a transaction, a financial institution associated with the transaction and determine that the identified financial institution is part of a consortium of financial institutions.

Based on identifying that the financial institution is part of the consortium of financial institutions, at step 304, the computing platform may execute a machine learning model to identify potential fraud in the request for transaction. For instance, the machine learning model may receive, as inputs, transaction details from the request for transaction and, upon execution of the model, may output a determination of whether fraud or potential fraud exists in the request for transaction. In some examples, the machine learning model may be a cloud-based model and may be associated with the consortium of financial institutions (e.g., may be unique to the consortium of financial institutions and/or applied for all financial institutions within the consortium).

In some examples, the machine learning model may be trained using historical transaction data (e.g., transaction data including transactions identified as fraudulent and not fraudulent) from one or more financial institutions of the consortium of financial institutions. In some arrangements, the model may be trained using historical data from a plurality of financial institutions of the consortium, and the plurality may be fewer than all financial institutions of the consortium.

At step 306, based on the output of the machine learning model, a determination may be made as to whether fraud or potential fraud exists in the requested transaction. If not, the transaction may be processed at step 308.

If fraud or potential fraud exists at step 306, at step 310, the computing platform may identify one or more transaction security actions to execute. In some examples, the transaction security action may be identified by the machine learning model. Additionally or alternatively, the transaction security action may be identified by other components or from other data stored by the computing platform. The identified one or more transaction security actions may be transmitted to the self-service kiosk. In some examples, transmitting the transaction security action may cause the self-service kiosk to execute the transaction security action.

At step 312, the computing platform may identify one or more other or additional self-service kiosks within a geo-location. In some examples, the geo-location may be a predetermined distance from the self-service kiosk.

At step 314, the computing platform may identify one or more self-service kiosk security actions. In some examples, the self-service kiosk security action may be identified by the machine learning model. Additionally or alternatively, the self-service kiosk security action may be identified by other components or from other data stored by the computing platform. The identified one or more self-service kiosk security actions may be transmitted to the one or more other or additional self-service kiosks. In some examples, transmitting the self-service kiosk security action may cause the one or more other or additional self-service kiosks to execute the self-service kiosk security action.

Figure 4:
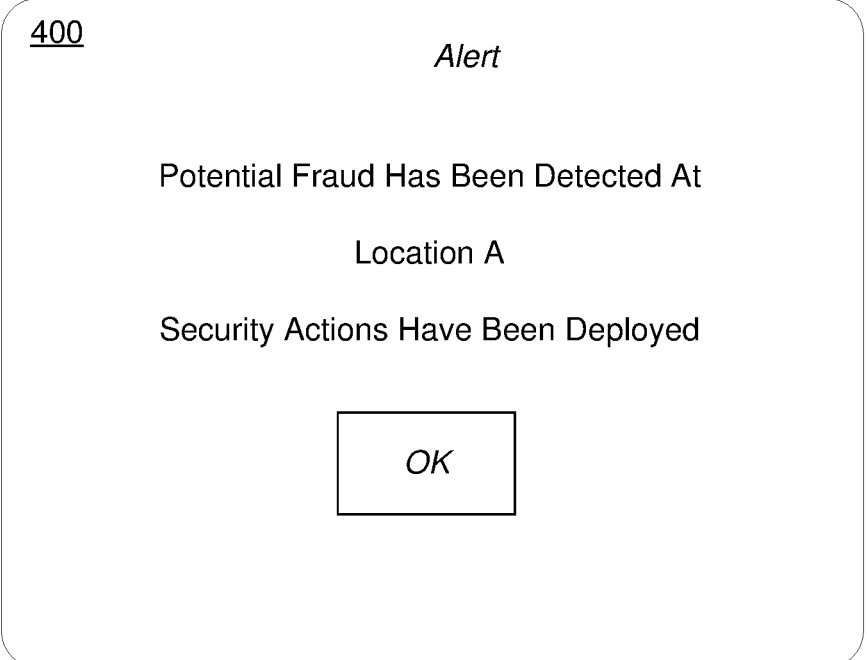
FIG. 4 illustrates an example graphical user interface that may be generated in accordance with one or more aspects described herein.

In some examples, the machine learning model may be updated or validated based on the determination of whether potential fraud exists, the identified one or more transaction security actions, and/or the identified one or more self-service kiosk security actions. In some examples, one or more notifications may be generated and transmitted to one or more devices indicating fraud or potential fraud. For instance, FIG. 4 illustrates one example user interface 400 that may be generated and sent to one or more administrator's, security personnel, or the like. The interface 400 may include an indication of detected fraud at a particular location and an indication that security actions have been deployed.

As discussed herein, a fraud detection model for universal use at a plurality of self-service kiosks associated with a plurality of different financial institutions is provided. By training the machine learning model using data from more than one financial institution, a more robust fraud detection model may be generated. Further, by providing continuously learning, the model may efficiently and quickly identify and implement changes in fraud detection patterns, and the like, to quickly (e.g., in real-time or near real-time) identify fraud across a spectrum of self-service kiosks and financial institutions that are part of a consortium. Accordingly, rather that waiting to update a model to enable additional fraud detection parameters, the arrangements described herein include continuously self-learning that enables continuous or near-continuous updating of the model.

Aspects described herein may be used to protect not only user data, funds, and the like, but also to provide physical security at self-service kiosks. For instance, the arrangements described herein may quickly and efficiently detect fraud, execute security actions to prevent processing of a fraudulent or potentially fraudulent transaction, and also implement or execute physical security actions to prevent damage to a self-service kiosk, additional fraud attempts at one or more self-service kiosks, or the like.

Further, aspects described herein may provide flexibility to pivot between different security profiles. For instance, different security profiles may be implemented by a machine learning model based on time of day, day of week, nearby events, specific location, and the like. By training the model using data from multiple financial institutions, the vast volume of data may be used to provide various security profiles that can be implemented on demand, on a scheduled basis, or the like. The vast amounts of data used to train the model, and data from different institutions, may enable different security perspectives, fraud perspectives, and the like, that might not otherwise be available to one or more financial institutions (e.g., data, model, fraud parameters, and the like are shared to enable efficient detection of fraud across multiple institutions).

In some examples, aspects described herein may be performed in addition to other financial institution-specific fraud detection models, systems, or the like. Accordingly, in some examples, the arrangements provided herein provide additional security and protections to users and financial institutions. In some examples, use of the arrangements described herein (e.g., the consortium-based machine learning model) may be enabled or disabled as desired. Further, financial institutions may join or leave the consortium as desired and, accordingly, the aspects described herein may be provided to or removed from financial institutions as they join or leave.

In some examples, the output of the fraud detection machine learning model may be fed into one or more systems internal to one or more financial institutions of the consortium to provide additional data related to the potential fraud. Accordingly, this may increase the speed at which detected fraud is addressed (e.g., via the one or more internal systems).

Accordingly, the arrangements described herein provide minimum standards for fraud detection at self-service kiosks for any financial institutions that have joined the consortium. The arrangements described herein provide for consortium fraud detection standards that may be heighted or enhanced with financial institution-specific rules as desired. However, the use of continuous learning model ensures or enables the systems to quickly learn from each transaction processed and update the model in real-time or near real-time to continuously improve accuracy in a manner not provided in conventional systems. Data from self-service kiosks associated with a plurality of financial institutions within the consortium may be used to update the model and improve accuracy of fraud detection processes. Further, other inputs such as third-party fraud or cybersecurity threat data, identified fraud actor lists, or the like, may be fed into the model to improve accuracy of fraud detection functions.

Further, the model described may efficiently detect fraud as well as identify actions that may be used to break a fraud pattern. For instance, if a pattern of fraud is detected by the machine learning model, an instruction, command or rule may be dynamically implemented by the machine learning model to break the fraud pattern, thereby reducing or eliminating impact of future attempts at similar types of fraudulent behaviors. For example, if a card skimmer has been used at a particular location, the system may detect an issue at the location and add additional security layers (e.g., provide a notification to avoid swiping a card at that location, disable the self-service kiosk, notify security or maintenance personnel, limit withdrawal amounts available at that location, or the like).

The fraud detection arrangements described herein may be used to detect various types of fraud attempted at various self-service kiosks. For instance, check fraud at an ATM (e.g., a user has altered a check to commit fraud, particular types of checks may be used to commit fraud, or the like), credit or debit card fraud, or the like. For example, anomalies in the color of a particular type of check, design of a particular type of check, alterations to a name or amount on a check, anomalies between a name and an account number on a check, anomalies in machine-readable codes, mismatch between a payee name and endorsee name, or the like, may be detected. In some examples, an unauthorized actor may attempt to commit fraud at a first location and may proceed to a second location to attempt a similar fraudulent act. The arrangements described herein may reduce or eliminate impact of these unauthorized actors by executing security actions not only at the self-service kiosk where the fraud took place, but at other self-service kiosks identified nearby or identified as potential vulnerable.

Additional types of fraud that may be detected by the arrangements described herein may include anomalies or potential issues in the age of an account, coordinated attacks in which counterfeit ATM cards are used to withdraw funds at multiple ATMs, or the like, may be detected.

As discussed, the arrangements described may also detect physical security issues related to the self-service kiosk. For instance, attempted theft of a self-service kiosk, attacks on night depositories, deliberate cash or deposit slot jams, unexpected change of position of the self-service kiosk, or the like, may be detected and notifications transmitted (e.g., to security personnel, account holders, administrators, or the like), doors locked in a vestibule, security footage captured and stored, and the like, to mitigate impact of the unauthorized actors.

An error rate associated with the machine learning model may also be determined or provided. For instance, in some examples, a less than 1% error rate may be set to limit inaccuracies, false positives, and the like. As the model continuously learns, accuracy will increase (e.g., bad or less good data may be overwritten with good or better data to improve accuracy of determinations). Further, model management functions may be provided to periodically evaluate accuracy of the model to ensure the model is performing as expected.

While aspects described herein are generally described in the context of a plurality of self-service kiosks, the arrangements described may be implemented for a single self-service kiosk, a fleet or cluster of self-service kiosks, all self-service kiosks associated with an entity, or the like.

Figure 5:
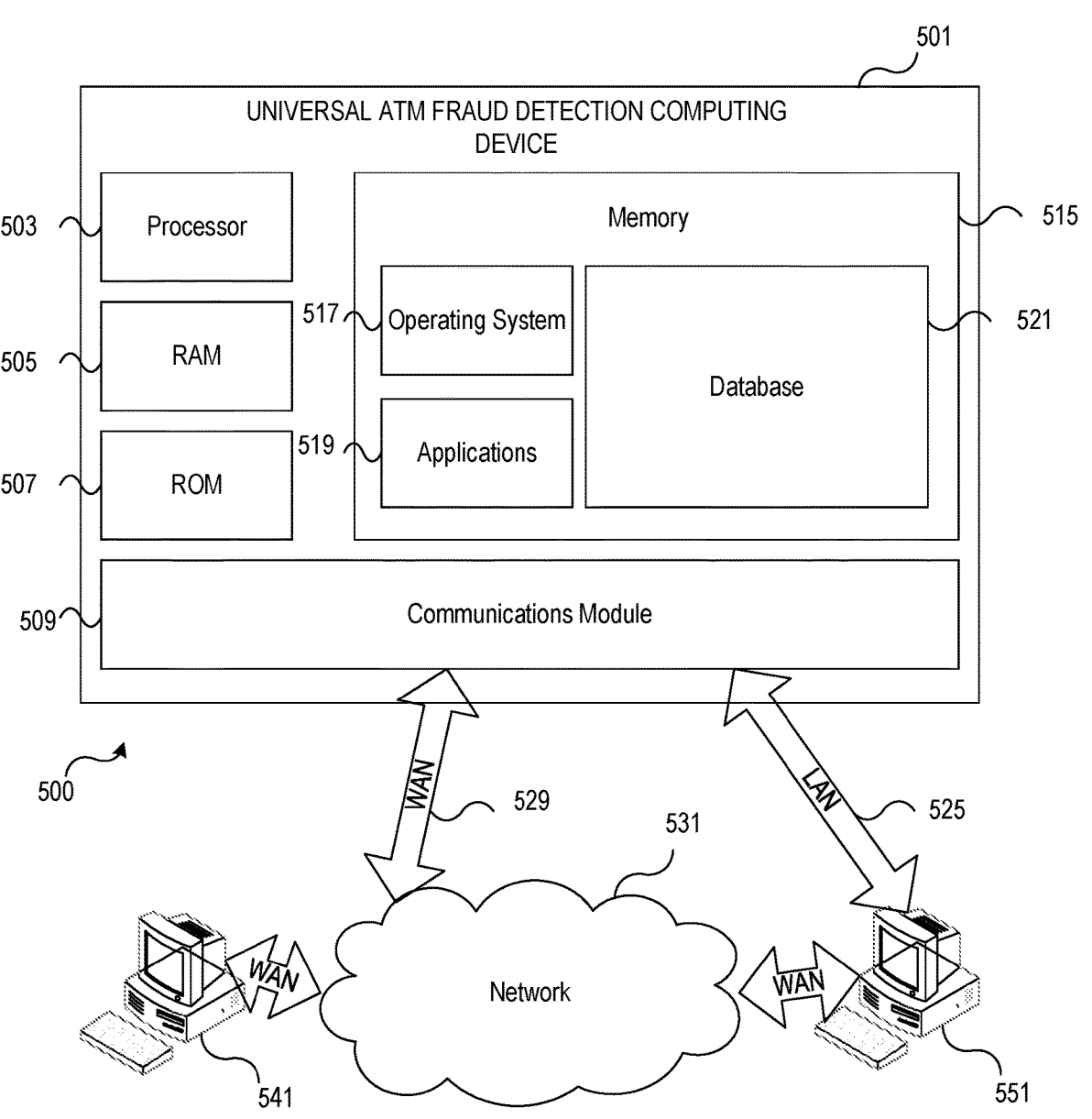
FIG. 5 illustrates one example environment in which various aspects of the disclosure may be implemented in accordance with one or more aspects described herein.

FIG. 5 depicts an illustrative operating environment in which various aspects of the present disclosure may be implemented in accordance with one or more example embodiments. Referring to FIG. 5, computing system environment 500 may be used according to one or more illustrative embodiments. Computing system environment 500 is only one example of a suitable computing environment and is not intended to suggest any limitation as to the scope of use or functionality contained in the disclosure. Computing system environment 500 should not be interpreted as having any dependency or requirement relating to any one or combination of components shown in illustrative computing system environment 500.

Computing system environment 500 may include universal ATM fraud detection computing device 501 having processor 503 for controlling overall operation of universal ATM fraud detection computing device 501 and its associated components, including Random Access Memory (RAM) 505, Read-Only Memory (ROM) 507, communications module 509, and memory 515. Universal ATM fraud detection computing device 501 may include a variety of computer readable media. Computer readable media may be any available media that may be accessed by universal ATM fraud detection computing device 501, may be non-transitory, and may include volatile and nonvolatile, removable and non-removable media implemented in any method or technology for storage of information such as computer-readable instructions, object code, data structures, program modules, or other data. Examples of computer readable media may include Random Access Memory (RAM), Read Only Memory (ROM), Electronically Erasable Programmable Read-Only Memory (EEPROM), flash memory or other memory technology, Compact Disk Read-Only Memory (CD-ROM), Digital Versatile Disk (DVD) or other optical disk storage, magnetic cassettes, magnetic tape, magnetic disk storage or other magnetic storage devices, or any other medium that can be used to store the desired information and that can be accessed by universal ATM fraud detection computing device 501.

Although not required, various aspects described herein may be embodied as a method, a data transfer system, or as a computer-readable medium storing computer-executable instructions. For example, a computer-readable medium storing instructions to cause a processor to perform steps of a method in accordance with aspects of the disclosed embodiments is contemplated. For example, aspects of method steps disclosed herein may be executed on a processor on universal ATM fraud detection computing device 501. Such a processor may execute computer-executable instructions stored on a computer-readable medium.

Software may be stored within memory 515 and/or storage to provide instructions to processor 503 for enabling universal ATM fraud detection computing device 501 to perform various functions as discussed herein. For example, memory 515 may store software used by universal ATM fraud detection computing device 501, such as operating system 517, application programs 519, and associated database 521. Also, some or all of the computer executable instructions for universal ATM fraud detection computing device 501 may be embodied in hardware or firmware. Although not shown, RAM 505 may include one or more applications representing the application data stored in RAM

505 while universal ATM fraud detection computing device 501 is on and corresponding software applications (e.g., software tasks) are running on universal ATM fraud detection computing device 501.

Communications module 509 may include a microphone, keypad, touch screen, and/or stylus through which a user of universal ATM fraud detection computing device 501 may provide input, and may also include one or more of a speaker for providing audio output and a video display device for providing textual, audiovisual and/or graphical output. Computing system environment 500 may also include optical scanners (not shown).

Universal ATM fraud detection computing device 501 may operate in a networked environment supporting connections to one or more other computing devices, such as computing device 541 and 551. Computing devices 541 and 551 may be personal computing devices or servers that include any or all of the elements described above relative to universal ATM fraud detection computing device 501.

The network connections depicted in FIG. 5 may include Local Area Network (LAN) 525 and Wide Area Network (WAN) 529, as well as other networks. When used in a LAN networking environment, universal ATM fraud detection computing device 501 may be connected to LAN 525 through a network interface or adapter in communications module 509. When used in a WAN networking environment, universal ATM fraud detection computing device 501 may include a modem in communications module 509 or other means for establishing communications over WAN 529, such as network 531 (e.g., public network, private network, Internet, intranet, and the like). The network connections shown are illustrative and other means of establishing a communications link between the computing devices may be used. Various well-known protocols such as Transmission Control Protocol/Internet Protocol (TCP/IP), Ethernet, File Transfer Protocol (FTP), Hypertext Transfer Protocol (HTTP) and the like may be used, and the system can be operated in a client-server configuration to permit a user to retrieve web pages from a web-based server.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like that are configured to perform the functions described herein.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

What is claimed is:

1. A computing platform, comprising:
   at least one processor;
   a communication interface communicatively coupled to the at least one processor; and
   a memory storing computer-readable instructions that, when executed by the at least one processor, cause the computing platform to:

train, using labelled data from historical transactions indicating whether each transaction of the historical transactions was fraudulent or non-fraudulent, a machine learning model to identify patterns in transaction data to determine whether the transaction data is potentially fraudulent;

receive, via a self-service kiosk, a request for transaction;

determine, based on the request for transaction, a financial institution associated with the request for transaction;

identify the financial institution as part of a consortium of financial institutions;

based on identifying the financial institution as part of the consortium of financial institutions, execute, in real-time, the machine learning model to identify potential fraud in the request for transaction, wherein executing the machine learning model includes using, as inputs, transaction details from the request for transaction to output a determination of whether potential fraud exists in the request for transaction and wherein the machine learning model is associated with the consortium of financial institutions;

responsive to determining that potential fraud does not exist in the request for transaction, processing the request for transaction;

responsive to determining that potential fraud does exist:

identify one or more transaction security actions in response to the request for transaction;

transmit, to the self-service kiosk, the identified one or more transaction security actions, wherein transmitting the identified one or more transaction security actions causes the self-service kiosk to execute the one or more transaction security actions;

identify one or more other self-service kiosks within a geo-location;

identify one or more self-service kiosk security actions; and transmit the one or more self-service kiosk security actions to the one or more other self-service kiosks within the geo-location, wherein transmitting the one or more self-service kiosk security actions to the one or more other self-service kiosks within the geo-location causes the one or more other self-service kiosks to execute the one or more self-service kiosk security actions and wherein executing the one or more self-service kiosk security actions includes disabling the one or more self-service kiosks to prevent further use.

2. The computing platform of claim 1, further including instructions that, when executed, cause the computing platform to:

receive, from a plurality of financial institutions of the consortium of financial institutions, the data from the historical transactions.

3. The computing platform of claim 2, wherein the plurality of financial institutions of the consortium of financial institutions is fewer than all financial institutions of the consortium of financial institutions.

4. The computing platform of claim 1, wherein the machine learning model is cloud-based.

5. The computing platform of claim 1, further including instructions that, when executed, cause the computing platform to:

update the machine learning model based on the determination of whether potential fraud exists in the request for transaction, the identified one or more transaction security actions, and the identified one or more self-service kiosk security actions.

6. The computing platform of claim 1, wherein the one or more self-service kiosk security actions further include activating at least one of: a camera or microphone at the one or more other self-service kiosks to capture one of: audio or video signals in a vicinity of the one or more self-service kiosks.

7. The computing platform of claim 1, further including instructions that, when executed, cause the computing platform to:

generate and send a notification of the determination of whether potential fraud exists in the request for transaction.

8. A method, comprising:

training, by a computing platform, the computing platform having at least one processor and memory and using labelled data from historical transactions indicating whether each transaction of the historical transactions was fraudulent or non-fraudulent, a machine learning model to identify patterns in transaction data to determine whether the transaction data is potentially fraudulent;

receiving, by the at least one processor, and via a self-service kiosk, a request for transaction;

determining, by the at least one processor and based on the request for transaction, a financial institution associated with the request for transaction;

identifying, by the at least one processor, the financial institution as part of a consortium of financial institutions;

based on identifying the financial institution as part of the consortium of financial institutions, executing, by the at least one processor and in real-time, the machine learning model to identify potential fraud in the request for transaction, wherein executing the machine learning model includes using, as inputs, transaction details from the request for transaction to output a determination of whether potential fraud exists in the request for transaction and wherein the machine learning model is associated with the consortium of financial institutions;

responsive to determining that potential fraud does not exist in the request for transaction, processing, by the at least one processor, the request for transaction;

responsive to determining that potential fraud does exist:

identifying, by the at least one processor, one or more transaction security actions in response to the request for transaction;

transmitting, by the at least one processor and to the self-service kiosk, the identified one or more transaction security actions, wherein transmitting the identified one or more transaction security actions causes the self-service kiosk to execute the one or more transaction security actions;

identifying, by the at least one processor, one or more other self-service kiosks within a geo-location;

identifying, by the at least one processor, one or more self-service kiosk security actions; and transmitting, by the at least one processor, the one or more self-service kiosk security actions to the one or more other self-service kiosks within the geo-location, wherein transmitting the one or more self-service kiosk security actions to the one or more other self-service kiosks within the geo-location causes the one or more other self-service kiosks to execute the one or more self-service kiosk security actions and wherein executing the one or more self-service kiosk security actions includes disabling the one or more self-service kiosks to prevent further use.

9. The method of claim 8, further including:

receiving, by the at least one processor and from a plurality of financial institutions of the consortium of financial institutions, the data from the historical transactions.

10. The method of claim 9, wherein the plurality of financial institutions of the consortium of financial institutions is fewer than all financial institutions of the consortium of financial institutions.

11. The method of claim 8, wherein the machine learning model is cloud-based.

12. The method of claim 8 further including:

updating, by the at least one processor, the machine learning model based on the determination of whether potential fraud exists in the request for transaction, the identified one or more transaction security actions, and the identified one or more self-service kiosk security actions.

13. The method of claim 8, wherein the one or more self-service kiosk security actions further include activating at least one of: a camera or microphone at the one or more other self-service kiosks to capture one of: audio or video signals in a vicinity of the one or more self-service kiosks.

14. The method of claim 8, further including:

generating and sending a notification of the determination of whether potential fraud exists in the request for transaction.

15. One or more non-transitory computer-readable media storing instructions that, when executed by a computing platform comprising at least one processor, memory, and a communication interface, cause the computing platform to:

train, using labelled data from historical transactions indicating whether each transaction of the historical transactions was fraudulent or non-fraudulent, a machine learning model to identify patterns in transaction data to determine whether the transaction data is potentially fraudulent;

receive, via a self-service kiosk, a request for transaction;

determine, based on the request for transaction, a financial institution associated with the request for transaction;

identify the financial institution as part of a consortium of financial institutions;

based on identifying the financial institution as part of the consortium of financial institutions, execute, in real-time, the machine learning model to identify potential fraud in the request for transaction, wherein executing the machine learning model includes using, as inputs, transaction details from the request for transaction to output a determination of whether potential fraud exists in the request for transaction and wherein the machine learning model is associated with the consortium of financial institutions;

responsive to determining that potential fraud does not exist in the request for transaction, processing the request for transaction;

responsive to determining that potential fraud does exist:

identify one or more transaction security actions in response to the request for transaction;

transmit, to the self-service kiosk, the identified one or more transaction security actions, wherein transmitting the identified one or more transaction security actions causes the self-service kiosk to execute the one or more transaction security actions;

identify one or more other self-service kiosks within a geo-location;

identify one or more self-service kiosk security actions; and transmit the one or more self-service kiosk security actions to the one or more other self-service kiosks within the geo-location, wherein transmitting the one or more self-service kiosk security actions to the one or more other self-service kiosks within the geo-location causes the one or more other self-service kiosks to execute the one or more self-service kiosk security actions and wherein executing the one or more self-service kiosk security actions includes disabling the one or more self-service kiosks to prevent further use.

16. The one or more non-transitory computer-readable media of claim 15, further including instructions that, when executed, cause the computing platform to:

receive, from a plurality of financial institutions of the consortium of financial institutions, the data from the historical transactions.

17. The one or more non-transitory computer-readable media of claim 16, wherein the plurality of financial institutions of the consortium of financial institutions is fewer than all financial institutions of the consortium of financial institutions.

* * * * *